United States Patent
Ormandy et al.

(10) Patent No.: US 8,510,715 B1
(45) Date of Patent: Aug. 13, 2013

(54) COVERAGE ANALYSIS USING SUB-INSTRUCTION PROFILING

(75) Inventors: Tavis Ormandy, Zurich (CH); William A. Drewry, Austin, TX (US)

(73) Assignee: Google Inc., Mountain View, CA (US)

( * ) Notice: Subject to any disclaimer, the term of this patent is extended or adjusted under 35 U.S.C. 154(b) by 779 days.

(21) Appl. No.: 12/693,595

(22) Filed: Jan. 26, 2010

(51) Int. Cl.
*G06F 9/44* (2006.01)

(52) U.S. Cl.
USPC ......................................................... 717/124

(58) Field of Classification Search
USPC ......................................................... 717/124
See application file for complete search history.

(56) References Cited

U.S. PATENT DOCUMENTS

| 2003/0188137 A1* | 10/2003 | Morris | 712/221 |
| 2003/0204836 A1* | 10/2003 | Srivastava et al. | 717/124 |
| 2008/0255813 A1* | 10/2008 | Fine et al. | 703/2 |
| 2010/0011057 A1* | 1/2010 | Ganai | 709/203 |

OTHER PUBLICATIONS

Sparks, "Automated Vulnerability Analysis: Leveraging Control Flow for Evolutionary Input Crafting", Sep. 27, 2007, IEEE, p. 477-486.*
U.S. Appl. No. 12/684,626, Ormandy et al., "Input Selection for Automatic Test Suite Generation", filed Jan. 8, 2010.

* cited by examiner

*Primary Examiner* — Li B Zhen
*Assistant Examiner* — Duy Khuong Nguyen
(74) *Attorney, Agent, or Firm* — Honigman Miller Schwartz and Cohn LLP

(57) ABSTRACT

Some embodiments provide a system that facilitates coverage analysis in a software program. During operation, the system identifies a complex instruction in the software program. Next, the system generates a set of sub-instruction blocks that is functionally equivalent to the complex instruction. Finally, the system uses the sub-instruction blocks in place of the complex instruction during coverage analysis of the software program.

15 Claims, 5 Drawing Sheets

COVERAGE ANALYSIS USING SUB-INSTRUCTION PROFILING

RELATED APPLICATION

The subject matter of this application is related to the subject matter in a co-pending non-provisional application by the same inventors as the instant application and filed on 8 Jan. 2010, entitled "Input Selection for Automatic Test Suite Generation," having Ser. No. 12/684,626.

BACKGROUND

1. Field

The present embodiments relate to techniques for analyzing code coverage during software testing. More specifically, the present embodiments relate to a method and system for dividing complex instructions into sub-instruction blocks and using the sub-instruction blocks in place of the complex instructions during code coverage analysis.

2. Related Art

Test suites are typically used to test a software program for conformity to a specified set of behaviors or requirements. In particular, a test suite may include a set of test cases, each of which tests a different requirement or specification for the software program. For example, a test suite for determining the correctness of an image decoder may supply a set of images to the image decoder. After processing each image, the output of the image decoder may be analyzed to determine if the image decoder is working correctly.

In addition, a test suite may be created to maximize code coverage of the software program. In other words, the collection of test cases in the test suite may be designed to test as much of the software program as possible. As a result, the selection of inputs for use in test suites may greatly affect the resulting code coverage provided by the test suites. For example, a wide variety of images may be used in a test suite to exercise different features of an image decoder during testing.

However, conventional techniques for selecting inputs to be used in test suites have a number of drawbacks. First, input selection for test suite generation is often accomplished manually. For example, an engineer may generate a test suite for a video decoder by manually browsing through a collection of video files and selecting a subset of the video files that are likely to test a variety of different features in the video decoder. However, manually selecting inputs for software testing is often tedious and leads to an incomplete set of inputs. For example, an engineer may have difficulty selecting a subset of a large number of inputs that provides maximal coverage of a software program.

On the other hand, employing a "brute force" approach that attempts to maximize coverage of the software program by supplying an extremely large set of inputs to the software program may be impractical or inefficient. For example, using the set of images available on the Internet to test an image decoder may be infeasible and unnecessary.

Moreover, coverage analysis of the software program may not be fine-grained enough to facilitate the generation of test suites that exercise all parts of the software program. For example, a conditional branch associated with a complex comparison may not be taken unless a specific input is provided. As a result, test suites are unlikely to cover the conditional branch, even with large numbers of inputs.

Hence, what is needed is a technique for selecting inputs for use in test suites that both efficiently and thoroughly tests the software program.

SUMMARY

Some embodiments provide a system that facilitates coverage analysis in a software program. During operation, the system identifies a complex instruction in the software program. Next, the system generates a set of sub-instruction blocks that is functionally equivalent to the complex instruction. Finally, the system uses the sub-instruction blocks in place of the complex instruction during coverage analysis of the software program.

In some embodiments, identifying the complex instruction in the software program involves identifying a basic block exit for a condition code in the software program and identifying a comparison instruction associated with setting the condition code prior to the basic block exit.

In some embodiments, generating the set of sub-instruction blocks that is functionally equivalent to the complex instruction involves dividing the comparison instruction into a series of simpler comparison instructions, wherein each of the simpler compare instructions compares a subset of a value used in the comparison instruction.

In some embodiments, each of the sub-instruction blocks corresponds to one of the simpler compare instructions and a branch instruction.

In some embodiments, using the sub-instruction blocks in place of the complex instruction during coverage analysis of the software program involves assigning a coverage score to the complex instruction based on a coverage of the sub-instruction blocks.

In some embodiments, the coverage score is used to facilitate fuzz testing of the software program.

In some embodiments, the coverage score is used to modify a test suite of the software program.

BRIEF DESCRIPTION OF THE FIGURES

In the figures, like reference numerals refer to the same figure elements.

DETAILED DESCRIPTION

Figure 1:
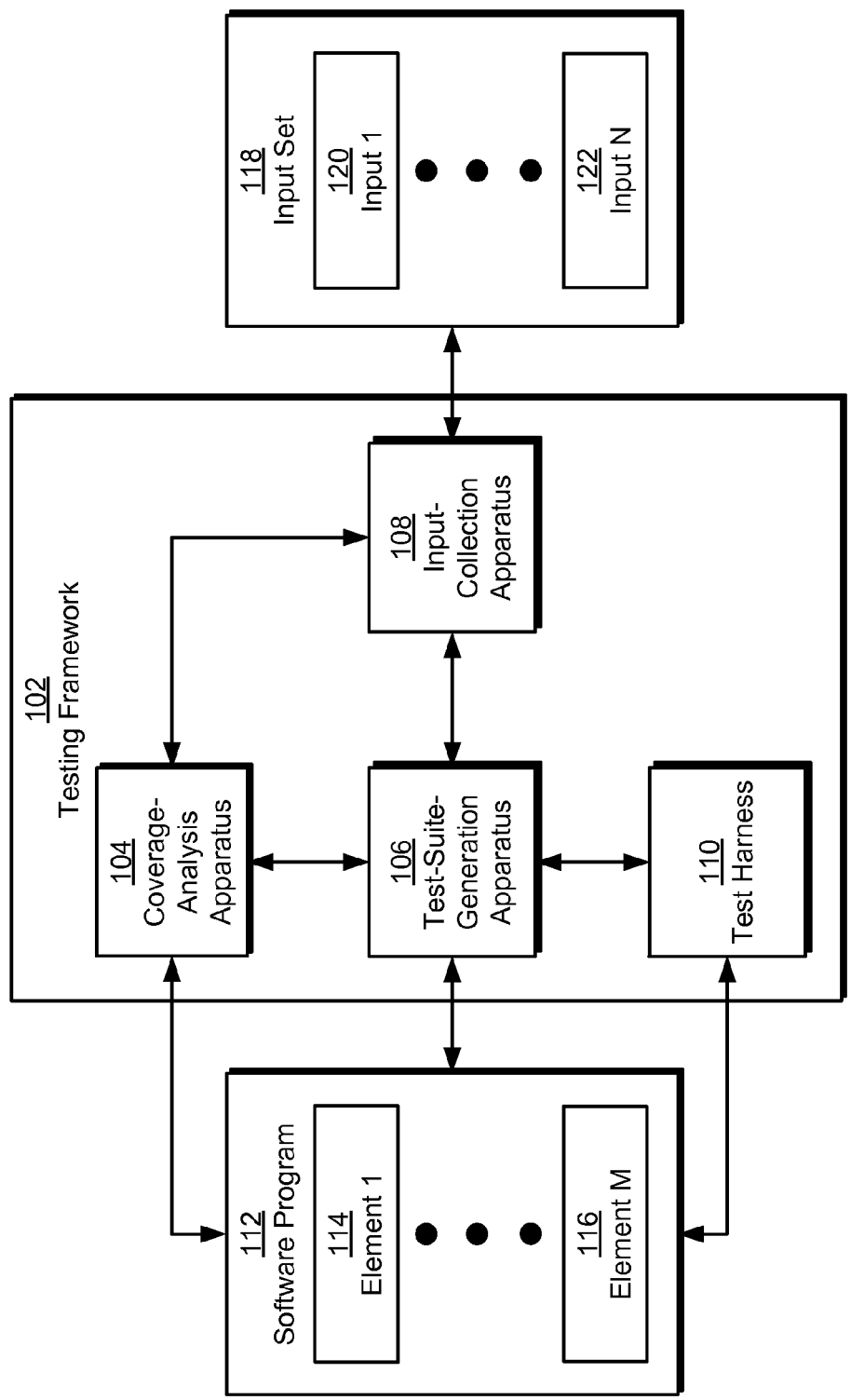
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for generating a test suite for a software program, such as an application, a library, a database, an operating system, and/or a device driver. The test suite may include a set of test cases that verify different requirements and/or specifications of the software program. The test cases may be generated from a set of inputs to the software program such that different inputs to the software program enable different parts of the software program to be tested.

More specifically, embodiments provide a method and system for facilitating coverage analysis of the software program using sub-instruction profiling. To facilitate coverage analysis, each complex instruction in the software program may be identified and divided into sub-instruction blocks that are functionally equivalent to the complex instruction. The complex instruction may correspond to a conditional instruction that requires a specific value for a branch associated with the conditional instruction to be taken. The sub-instruction blocks may be used in place of the complex instruction during coverage analysis of the software program. In particular, a coverage score may be assigned to the complex instruction based on the coverage of the sub-instruction blocks by an input. The coverage score may then be used to facilitate fuzz testing of the software program and/or modify the test suite for the software program.

FIG. 1 shows a schematic of a system in accordance with an embodiment. As shown in FIG. 1, the system includes a testing framework 102 for testing a software program 112. Testing framework 102 includes a coverage-analysis apparatus 104, a test-suite-generation apparatus 106, an input-collection apparatus 108, and a test harness 110. Each of these components is described in further detail below.

Software program 112 may correspond to a standalone application, operating system, enterprise application, database, library, device driver, and/or other type of software. In addition, software program 112 may be executed in a variety of environments. For example, software program 112 may be executed on a single desktop computer or workstation, or software program 112 may be distributed across multiple servers within a data center.

Software program 112 includes a set of elements (e.g., element 1 114, element m 116). Each element may correspond to an instruction, opcode, function, and/or other unit of software program 112 that is executed by a processor (e.g., a central processing unit (CPU)) to implement the functionality of software program 112. In other words, the elements may correspond to machine code instructions, bytecode instructions, and/or other executable operations that make up software program 112.

Those skilled in the art will appreciate that software program 112 may include a number of bugs, faults, and/or vulnerabilities. The bugs, faults, and/or vulnerabilities may cause software program 112 to execute incorrectly, crash, hang, and/or grant access to unauthorized applications or users. As a result, the development process of software program 112 may involve testing to detect defects in software program 112. Defects found through testing may then be fixed (e.g., patched) to improve the performance and correctness of software program 112.

In one or more embodiments, testing framework 102 is used to test software program 112 for bugs, faults, vulnerabilities, and/or other defects. For example, testing framework 102 may perform unit testing, regression testing, fuzz testing, and/or correctness analysis on software program 112. The operation of testing framework 102 may be automated and/or manually controlled by a user. For example, testing framework 102 may include a command line interface (CLI) that accepts commands related to testing of software program 112 from the user and/or a graphical user interface (GUI) that interacts with the user through graphical objects such as menus, buttons, windows, toolbars, and/or other GUI elements. Alternatively, some or all of the testing activities performed by testing framework 102 may be automated by a script associated with testing framework 102.

Regardless of the mode of operation, testing framework 102 may test software program 112 using a test suite that examines software program 112 for conformity to a set of specifications and/or requirements. Furthermore, the test suite may be generated from an input set 118 containing one or more inputs (e.g., input 1 120, input n 122) to software program 112. For example, the test suite may include a number of images that are used to test various features in an image decoder.

Those skilled in the art will appreciate that test suites for software program 112 may provide inadequate coverage of software program 112 and/or test software program 112 inefficiently. For example, a test suite for software program 112 may be created using inputs that are manually selected by an engineer or tester, as well as randomly generated inputs. The test suite may include a large number of test cases that repetitively test the same elements (e.g., features, branches, etc.) in software program 112. The test suite may also fail to include test cases that provide coverage of other elements of software program 112, thus omitting the other elements from testing by testing framework 102.

More specifically, software program 112 may include complex instructions that prevent conditional branches from being taken unless a specific input is provided. For example, a complex instruction in software program 112 may correspond to the following conditional instruction:
  if (memcmp("MAGIC", input, 5)==0) {
   . . .

Because the branch associated with the conditional instruction is only taken if the "input" variable equals a specific five-byte value, test suites with random inputs are highly unlikely to provide coverage of the branch.

Moreover, typical coverage analysis mechanisms may not be fine-grained enough to facilitate the generation of inputs that test complex instructions in software program 112. For example, a fuzz-testing technique that generates inputs for the exemplary conditional instruction above may have a search space of $2^{40}$ possible values and no feedback regarding the closeness of an input to the value that satisfies the condition (e.g., "memcmp("MAGIC", input, 5)==0"). As a result, the fuzz-testing technique may not have enough information to test the branch by generating an input that satisfies the condition.

To mitigate issues associated with test suite code coverage and efficiency, testing framework 102 may include functionality to provide finer-grained feedback regarding the coverage of complex instructions in software program 112 through sub-instruction profiling of the complex instructions. In particular, coverage-analysis apparatus 104 may identify complex instructions in software program 112 and generate sets of sub-instruction blocks that are functionally equivalent to the complex instructions. In other words, coverage-analysis apparatus 104 may divide each complex instruction into a series of sub-instruction blocks that correspond to subsections of the complex instruction. Coverage-analysis apparatus 104 may then use the sub-instruction blocks in place of the complex instruction during coverage analysis of software program 112. As discussed below, the results of the coverage analysis may then be used to facilitate testing of software program 112.

In one or more embodiments, input-collection apparatus 108 includes functionality to obtain a large input set 118 (e.g., input 1 120, input n 122) for software program 112. For example, input-collection apparatus 108 may have access to one or more repositories that contain possible inputs for software program 112. Along the same lines, input-collection apparatus 108 may correspond to a web crawler that collects inputs from the Internet. Alternatively, input-collection apparatus 108 may generate the inputs randomly and/or according to specifications of inputs accepted by software program 112. For example, input-collection apparatus 108 may use a fuzz-testing technique to generate inputs for a signal-processing software program as a set of digital periodic waveforms (e.g., sine waves, square waves, sawtooth waves, etc.) with randomized parameters (e.g., amplitudes, frequencies, phases, harmonics, etc.).

The set of inputs obtained by input-collection apparatus 108 may then be provided to coverage-analysis apparatus 104 for selection of one or more inputs to be used in a test suite for software program 112. In one or more embodiments, coverage-analysis apparatus 104 determines a subset of the inputs that substantially provides the same coverage of software program 112 and uses the subset of inputs to generate the test suite for software program 112. Input selection for test suite generation is discussed in a co-pending non-provisional application by the same inventors as the instant application and filed on the same day as the instant application entitled "Input Selection for Automatic Test Suite Generation," having Ser. No. 12/684,626, and filing date 8 Jan. 2010, which is incorporated herein by reference.

As mentioned above, coverage-analysis apparatus 104 may determine the coverage of software program 112 associated with input set 118 using sub-instruction blocks in place of each complex instruction in software program 112. Consequently, coverage-analysis apparatus 104 may provide feedback regarding the coverage of input set 118 at the sub-instruction level. Complex instructions, sub-instruction blocks, and coverage analysis of software program 112 are discussed in further detail below with respect to FIG. 2.

Test-suite-generation apparatus 106 may obtain the subset of inputs from coverage-analysis apparatus 104 and/or input-collection apparatus 108 and generate the test suite from the subset of inputs. For example, test-suite-generation apparatus 106 may generate a test case from each input in the subset of inputs and assemble the test suite from the test cases. Test-suite-generation apparatus 106 may also alter one or more inputs from the subset of inputs prior to using the input(s) in the test suite. In particular, test-suite-generation apparatus 106 may apply a fuzz-testing technique to randomize various attributes of the input(s). As described below with respect to FIG. 2, the fuzz-testing technique may be facilitated by the use of sub-instruction blocks during coverage analysis of software program 112 that reduce the search space of possible values that satisfy conditions associated with complex instructions. Such alteration of inputs by test-suite-generation apparatus 106 may further extend the coverage of software program 112 by the test suite.

Finally, test harness 110 may execute the test suite on software program 112. In one or more embodiments, test harness 110 enables communication between software program 112 and testing framework 102 and allows test cases to be run on software program 112. For example, test harness 110 may hook test cases within the test suite to developed code within software program 112 and monitor the behavior and outputs of software program 112 under the executing test cases. Test harness 110 may also provide the monitored behavior and outputs to an analysis mechanism, which may analyze the collected data to determine the validity of software program 112. As a result, test harness 110 may enable regression testing, unit testing, correctness analysis, and/or bug finding to be performed on software program 112 by testing framework 102.

Figure 2:
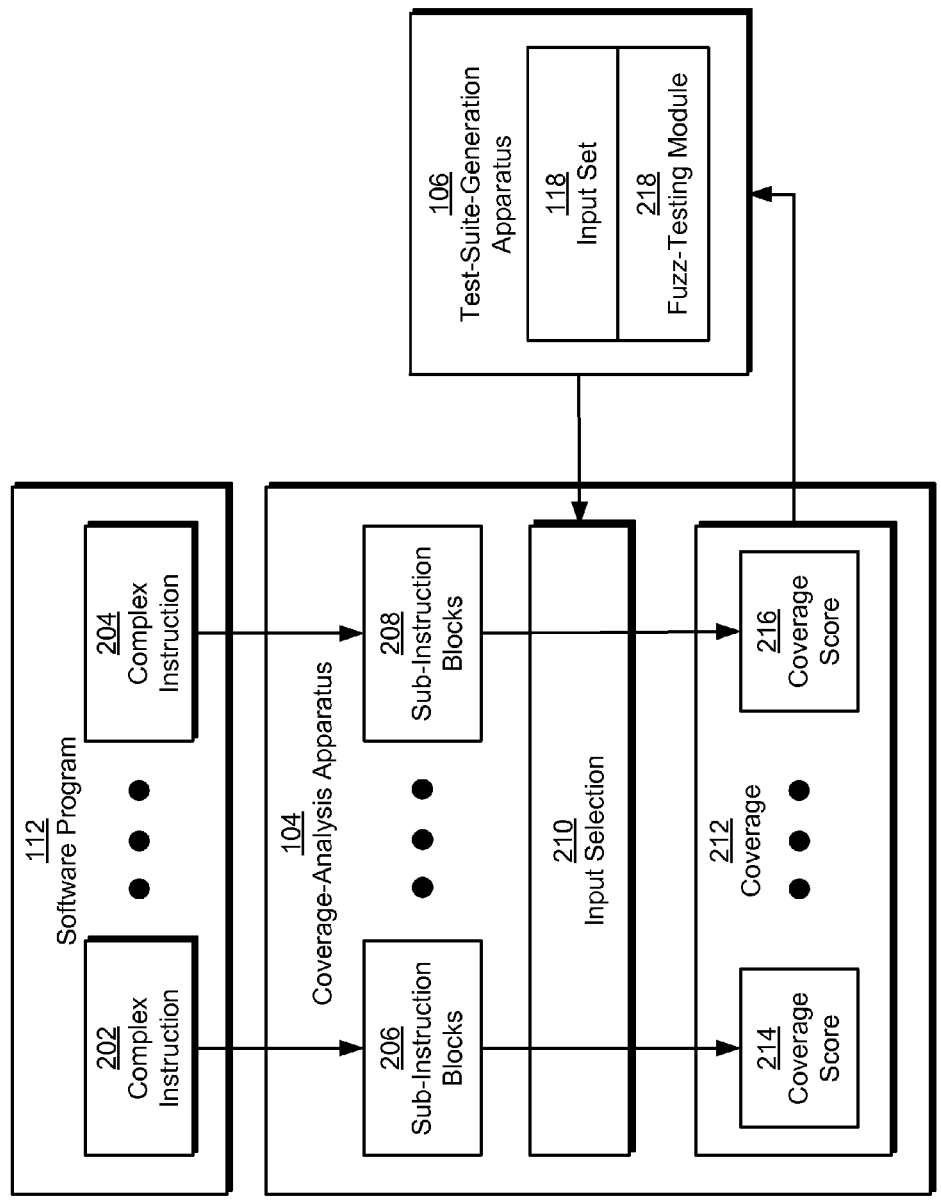
FIG. 2 shows the use of sub-instruction profiling to facilitate coverage analysis and test-suite generation in accordance with an embodiment.

FIG. 2 shows the use of sub-instruction profiling to facilitate coverage analysis and test-suite generation in accordance with an embodiment.

As shown in FIG. 2, software program 112 includes a set of complex instructions 202-204. Each complex instruction 202-204 may correspond to a conditional instruction that requires a specific input for the condition to be met. For example, a complex instruction may correspond to the following high-level conditional instruction:

if (tag==0x82739456) {
. . .

In one or more embodiments, coverage-analysis apparatus 104 identifies complex instructions 202-204 in software program 112 by identifying basic block exits (e.g., "JE," "JNE," "JZ," etc.) for condition codes in software program 112, then identifying comparison instructions associated with setting the condition codes (e.g., "cmp," "cmpsb," "cmpsw," "cmpsd," "test," etc.) prior to the basic block exits. For example, the exemplary complex instruction above may be identified by finding the following comparison instruction and basic block exit:

cmp eax, 0x82739456
je newblock

Because the basic block exit is only taken if the value stored in the eax register equals a specific four-byte value (e.g., "0x82739456"), the conditional branch corresponding to the complex instruction is statistically unlikely to be taken when randomly generated input is used to test software program 112.

To facilitate coverage of conditional branches associated with complex instructions 202-204 within test suites, coverage-analysis apparatus 104 may generate sets of sub-instruction blocks 206-208 corresponding to complex instructions 202-204. As mentioned previously, each set of sub-instruction blocks 206-208 may be functionally equivalent to the corresponding complex instruction 202-204. Furthermore, each set of sub-instruction blocks 206-208 may be generated by dividing the comparison instruction within a complex instruction 202-204 into a series of simpler instructions, in which each simpler instruction compares a subset of the value used in the comparison instruction. Each sub-instruction block may then be generated as one of the simpler compare instructions and a branch instruction. For example, four sub-instruction blocks for the exemplary complex instruction above may correspond to the following:

cmp al, 0x56
jne .over
ror eax, 8
cmp al, 0x94
jne .over
ror eax, 8
cmp al, 0x73
jne .over
ror eax, 8
cmp al, 0x82
jne .over
ror eax, 8

Because the value used in the condition for the complex instruction is divided into four values of one byte each that are compared separately, the search space for the value may be reduced from $2^{32}$ possible values to $4*2^8$ possible values. The search space may be further reduced to $8*2^4$ if each sub-instruction block compared a four-bit subset of the value used in the condition for the complex instruction. In other words, coverage-analysis apparatus 104 may generate different sets of sub-instruction blocks 206-208 for the same type of complex instruction 202-204 based on the condition associated with the complex instruction and/or the search space for the value that satisfies the condition.

Coverage-analysis apparatus 104 may then determine a coverage 212 of software program 112 by an input selection 210 using sub-instruction blocks 206-208 in place of complex instructions 202-204. Input selection 210 may be provided by test-suite-generation apparatus 106 as sample inputs (e.g., sample images for an image decoder) and/or randomly generated by a fuzz-testing module 218 in test-suite-generation apparatus 106.

To determine coverage 212 of software program 112 using sub-instruction blocks 206-208, coverage-analysis apparatus 104 may assign a coverage score 214-216 to each complex instruction 202-204 based on the coverage of sub-instruction blocks 206-208 provided by inputs from input selection 210. For example, a complex instruction may be divided into four sub-instruction blocks during coverage analysis. The coverage score for the complex instruction may range from 0 to 4, with inputs that don't meet any conditions of the sub-instruction blocks assigned a coverage score of 0 and inputs that meet all conditions of the sub-instruction blocks assigned a coverage score of 4.

Test-suite-generation apparatus 106 may use coverage scores 214-216 to generate and/or modify a test suite for software program 112. For example, test-suite-generation apparatus 106 may select the test suite for software program 112 from input set 118 based on the coverage of each input in input set 118, including coverage scores 214-216 for complex instructions 202-204.

Fuzz-testing module 218 may also use coverage scores 214-216 to facilitate fuzz testing of software program. More specifically, fuzz-testing module 218 may modify an input to software program 112 to increase one or more coverage scores 214-216 for the input until the input causes the branch associated with a complex instruction 202-204 to be taken. For example, fuzz-testing module 218 may identify a value used in a condition for a complex instruction by modifying the input to the complex instruction to satisfy the condition of the first sub-instruction block for the complex instruction, then the condition of the second sub-instruction block, and so on until the input is equal to the value.

Figure 3:
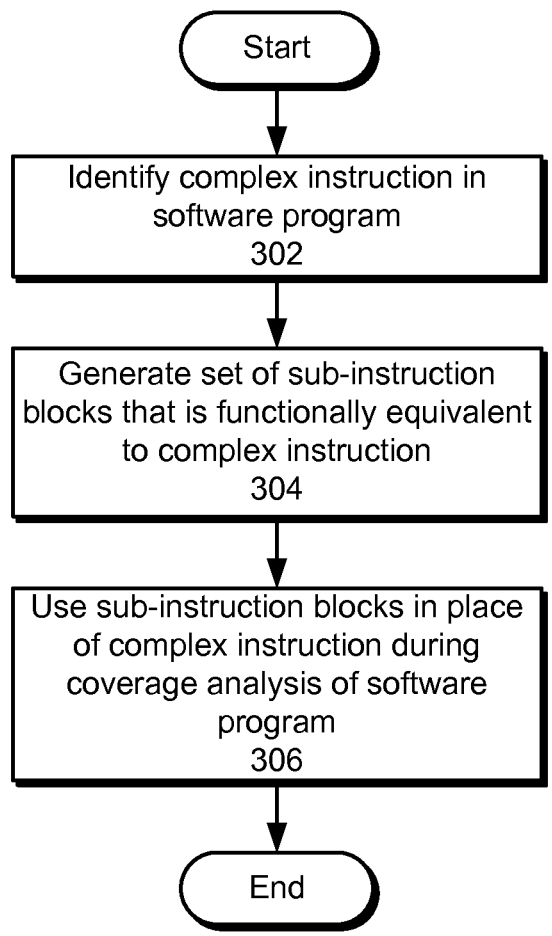
FIG. 3 shows a flowchart illustrating the process of facilitating coverage analysis in a software program in accordance with an embodiment.

FIG. 3 shows a flowchart illustrating the process of facilitating coverage analysis in a software program in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, a complex instruction in a software program is identified (operation 302). The complex instruction may correspond to a conditional instruction that requires a specific input for the condition to be met. The complex instruction may be identified by identifying a basic block exit for a condition code in the software program and then identifying a comparison instruction associated with setting the condition code prior to the basic block exit. For example, the complex instruction may be identified as a conditional jump instruction and a comparison instruction that occurs most recently before the conditional jump instruction.

Next, a set of sub-instruction blocks that is functionally equivalent to the complex instruction is generated (operation 304). The sub-instruction blocks may be generated by dividing the comparison instruction into a series of simpler comparison instructions such that each of the simpler compare instructions compares a subset of a value used in the comparison instruction. Each sub-instruction block may then be generated as one of the simpler compare instructions and a branch instruction (e.g., conditional jump instruction).

Finally, the sub-instruction blocks are used in place of the complex instruction during coverage analysis of the software program (operation 306). Coverage analysis of the software program may include assigning a coverage score to the complex instruction based on the coverage of the sub-instruction blocks by an input or set of inputs. The coverage score may then be used to generate and/or modify a test suite of the software program and/or facilitate fuzz testing of the software program.

Figure 4:
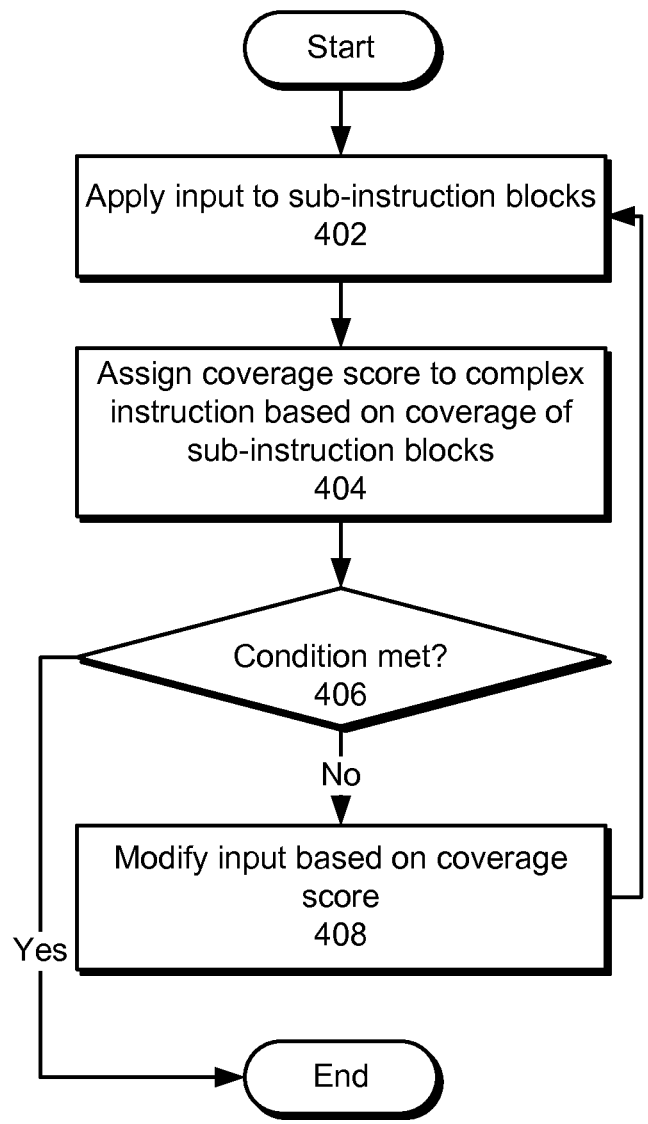
FIG. 4 shows a flowchart illustrating the process of using a coverage score for a complex instruction in accordance with an embodiment.

FIG. 4 shows a flowchart illustrating the process of using a coverage score for a complex instruction in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, an input is applied to a set of sub-instruction blocks (operation 402). The sub-instruction blocks may be functionally equivalent to a complex instruction in a software program and may be used in place of the complex instruction during coverage analysis of the software program. Next, a coverage score is assigned to the complex instruction based on the coverage of the sub-instruction blocks (operation 404) by the input. A higher coverage score may correspond to higher coverage of the sub-instruction blocks, while a lower coverage score may correspond to lower coverage of the sub-instruction blocks. For example, coverage of a set of ten sub-instruction blocks may be assessed as a coverage score from 0 to 10, with a coverage score of 0 representing a coverage of zero sub-instruction blocks and a coverage score of 10 representing a coverage of all ten sub-instruction blocks.

The coverage score is then used to determine if the condition associated with the complex instruction is met (operation 406). For example, a maximum coverage score for a set of sub-instruction blocks may signify an input that satisfies the condition associated with the complex instruction (e.g., the input equals a specific value). If the condition is met, then the input does not have to be modified and may be used to test the branch associated with the complex instruction.

However, if the condition is not met, the input is modified based on the coverage score (operation 408). For example, feedback regarding subsets of a value required to meet the condition for the complex instruction may be provided by the coverage of the sub-instruction blocks by the input. As described above, the feedback may reduce the search space for the value to a size that allows the value to be discovered using a fuzz-testing technique. If the input covers a sub-instruction block, the portion of the input compared in the sub-instruction block may match the subset of the value required to meet the condition. As a result, a portion of the input may be repeatedly modified and a new coverage score obtained (operations 402-404) until the modified portion matches the subset of the value associated with a sub-instruction block and the coverage score increases. Modification of the input may continue until the coverage score reaches the maximum possible coverage score for the complex instruction, thus indicating that the condition for the complex instruction is met by the input.

Figure 5:
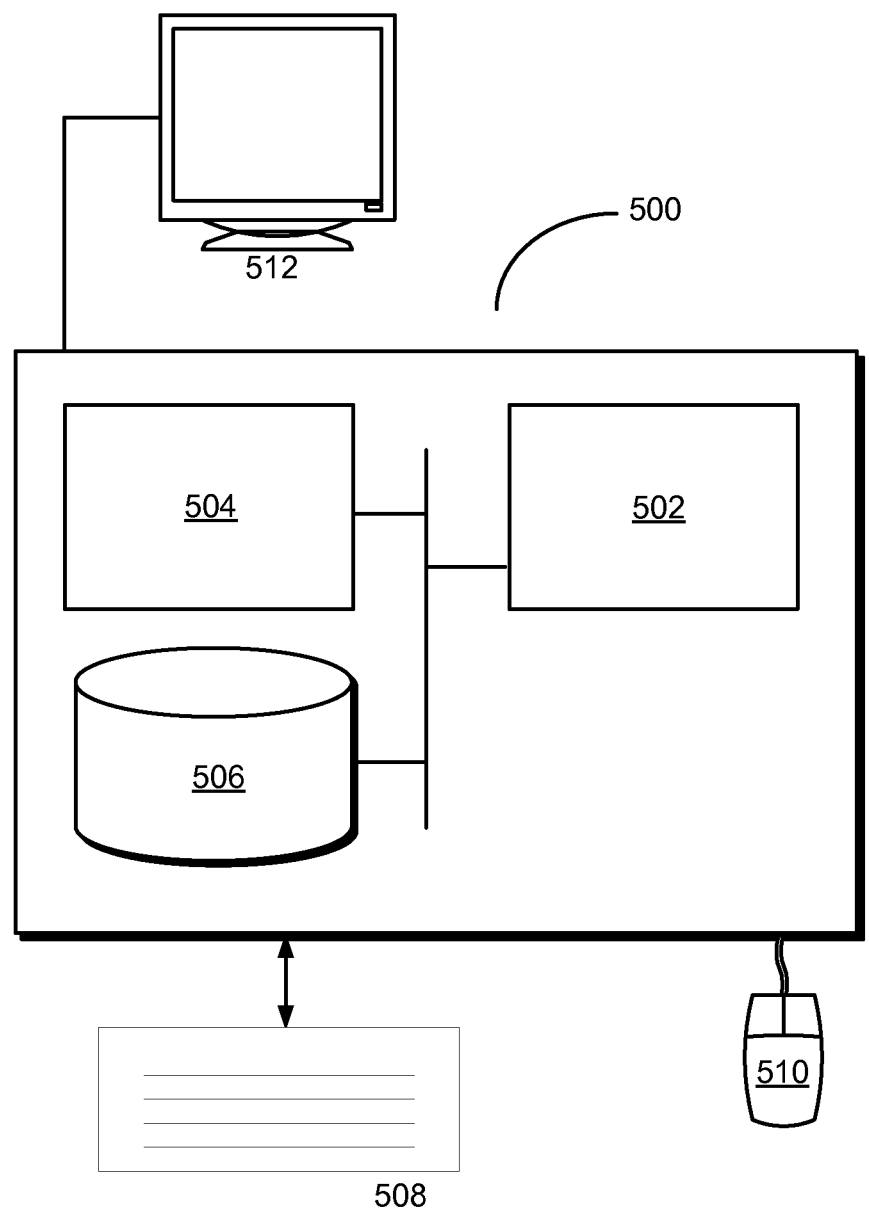
FIG. 5 shows a computer system in accordance with an embodiment.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In particular, computer system 500 may execute a testing framework that performs coverage analysis on a software program and generates test suites for the software program. The testing framework may include an input-collection apparatus that obtains a set of inputs for the software program. The validation framework may also include a coverage-analysis apparatus that determines a coverage of the software program associated with the set of inputs using sub-instruction blocks in place of complex instructions in the software program during coverage analysis. The coverage-analysis apparatus may also assign coverage scores to the complex instructions based on the coverage of the sub-instruction blocks. Furthermore, the validation framework may include a test-suite-generation apparatus that modifies a test suite for the software program using the coverage score. In particular, the test-suite-generation apparatus may use the coverage score to facilitate fuzz testing of the software program. Finally, the validation framework may include a test harness that executes the test suite on the software program.

In addition, one or more components of computer system 500 may be remotely located and connected to the other components over a network. Portions of the present embodiments (e.g., coverage-analysis apparatus, input-collection apparatus, test-suite-generation apparatus, test harness, etc.) may also be located on different nodes of a distributed system that implements the embodiments.

The foregoing descriptions of various embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments.

What is claimed is:

1. A computer-implemented method for facilitating coverage analysis in a software program, the method comprising:
identifying a complex instruction in the software program by:
identifying a basic block exit for a condition code in the software program; and
identifying a comparison instruction associated with setting the condition code prior to the basic block exit;
generating a set of sub-instruction blocks that is functionally equivalent to the complex instruction by dividing the comparison instruction into a series of simpler comparison instructions, wherein each of the simpler compare instructions compares a subset of a value used in the comparison instruction; and
using the sub-instruction blocks in place of the complex instruction during coverage analysis of the software program.

2. The computer-implemented method of claim 1, wherein each of the sub-instruction blocks corresponds to one of the simpler compare instructions and a branch instruction.

3. The computer-implemented method of claim 1, wherein using the sub-instruction blocks in place of the complex instruction during coverage analysis of the software program involves:
assigning a coverage score to the complex instruction based on a coverage of the sub-instruction blocks.

4. The computer-implemented method of claim 3, wherein the coverage score is used to facilitate fuzz testing of the software program.

5. The computer-implemented method of claim 3, wherein the coverage score is used to modify a test suite of the software program.

6. A system for facilitating coverage analysis in a software program executing on a computing processor, the system comprising:
an input-collection apparatus configured to obtain a set of inputs for the software program; and
a coverage-analysis apparatus configured to:
identify a complex instruction in the software program by:
identifying a basic block exit for a condition code in the software program; and
identifying a comparison instruction associated with setting the condition code prior to the basic block exit;
generate a set of sub-instruction blocks that is functionally equivalent to the complex instruction by dividing the comparison instruction into a series of simpler comparison instructions, wherein each of the simpler compare instructions compares a subset of a value used in the comparison instruction; and determine a coverage of the software program associated with the set of inputs using the sub-instruction blocks in place of the complex instruction.

7. The system of claim 6, wherein using the sub-instruction blocks in place of the complex instruction during coverage analysis of the software program involves:

assigning a coverage score to the complex instruction based on a coverage of the sub-instruction blocks.

8. The system of claim 7, further comprising:

a test-suite-generation apparatus configured to modify a test suite of the software program based on the coverage score.

9. The system of claim 7, wherein the coverage score is used to facilitate fuzz testing of the software program.

10. The system of claim 6, wherein each of the sub-instruction blocks corresponds to one of the simpler compare instructions and a branch instruction.

11. A non-transitory computer-readable storage medium storing instructions that when executed by a computer cause the computer to perform a method for facilitating coverage analysis in a software program, the method comprising:

identifying a complex instruction in the software program by:

identifying a basic block exit for a condition code in the software program; and identifying a comparison instruction associated with setting the condition code prior to the basic block exit;

generating a set of sub-instruction blocks that is functionally equivalent to the complex instruction by dividing the comparison instruction into a series of simpler comparison instructions, wherein each of the simpler compare instructions compares a subset of a value used in the comparison instruction; and using the sub-instruction blocks in place of the complex instruction during coverage analysis of the software program.

12. The non-transitory computer-readable storage medium of claim 11, wherein each of the sub-instruction blocks corresponds to one of the simpler compare instructions and a branch instruction.

13. The non-transitory computer-readable storage medium of claim 11, wherein using the sub-instruction blocks in place of the complex instruction during coverage analysis of the software program involves:

assigning a coverage score to the complex instruction based on a coverage of the sub-instruction blocks.

14. The non-transitory computer-readable storage medium of claim 13, wherein the coverage score is used to facilitate fuzz testing of the software program.

15. The non-transitory computer-readable storage medium of claim 13, wherein the coverage score is used to modify a test suite of the software program.

* * * * *